United States Patent [19]
Bronaugh et al.

[11] 3,913,015
[45] Oct. 14, 1975

[54] TUNED CURRENT PROBE

[75] Inventors: Edwin L. Bronaugh, San Antonio, Tex.; Roger A. Southwick, Tucson, Ariz.

[73] Assignee: The United States of America as represented by the Secretary of the Air Force, Washington, D.C.

[22] Filed: July 26, 1974

[21] Appl. No.: 492,094

[52] U.S. Cl................................ 324/127; 324/117 R
[51] Int. Cl.² ..................... G01R 1/20; G01R 19/00
[58] Field of Search........ 324/127, 117 R, 149, 129, 324/72.5

[56] References Cited
UNITED STATES PATENTS
3,356,939  12/1967  Stevenson........................... 324/127

Primary Examiner—Alfred E. Smith
Assistant Examiner—Ernest F. Karlsen
Attorney, Agent, or Firm—Joseph E. Rusz; Willard R. Matthews, Jr.

[57] ABSTRACT

High transfer impedance and hence improved sensitivity is achieved in line current measuring apparatus by making the current detecting probe resonant to the frequency of the line conducted signal being measured. The current detecting probes are inductive pick-off coils and resonance is accomplished by means of a variable capacitance circuit connected in parallel with the pick-off coils. The parallel resonant circuit drives a high input impedance low output impedance amplifier. A broad band signal measuring system employs multiple probes each of which has a frequency range that covers a portion of the system operating frequency range. The circuit of the highest frequency probe is balanced and utilizes back-to-back series connected voltage variable capacitance diodes in its variable capacitance circuit.

3 Claims, 4 Drawing Figures

TUNED CURRENT PROBE

BACKGROUND OF THE INVENTION

This invention relates to apparatus for measuring current values of line conducted electrical signals, and in particular to the current probes of such apparatus and to means for improving probe and system sensitivity.

The probe of inductive pick-off coils utilized in currently available line current measuring systems are subject to a significant measurement sensitivity limitation. This limitation is due primarily to the low transfer impedance of the current probes. Conventional devices have transfer impedances that range between five and ten ohms maximum with valves of less than one ohm common. Since higher transfer impedances result in the ability to measure smaller currents, the present need for high sensitivity line current measuring apparatus can best be met by the use of high transfer impedance probes. The present invention is directed toward satisfying the need for high sensitivity line current measuring systems through the use of novel means for achieving such high transfer impedances.

SUMMARY OF THE INVENTION

The present invention comprehends a line current measuring system in which the probe coils are tuned to resonate at the measurement frequency so that the "Q" of the resonant circuit becomes a multiplying factor to increase the transfer impedance of the probe and hence the sensitivity of the system. The probe resonant circuit consists of the inductance of the pick-off coil and a parallel variable capacitance. A high input impedance to low output impedance amplifier is used to interface the tuned circuit with the system indicating meter. A complete system utilizes multiple tuned probes each of which has a frequency range that constitutes an integral increment portion of the system frequency range. The highest frequency probe has a resonant circuit that is both tuned and balanced and employs back-to-back voltage variable capacitance diodes as the variable capacitance means.

It is a principal object of the invention to provide a new and improved system for measuring the current values of line conducted electrical signals.

It is another object of the invention to provide a new and improved current probe for use in line conducted current measuring apparatus.

It is another object of the invention to provide a system for measuring the current values of line conducted electrical signals that has greater sensitivity than currently available systems.

It is another object of the invention to provide for use in such systems a tuned probe having high transfer impedance characteristics.

It is another object of the invention to provide a system for measuring the current values of line conducted electrical signals having high sensitivity and a wide operating frequency range.

These, together with other objects, features and advantages of the invention will become more readily apparent from the following detailed description when taken in conjunction with the illustrative embodiments in the accompanying drawings.

DETAILED DESCRIPTION OF THE PREFERRED EMBODIMENTS

Figure 1:
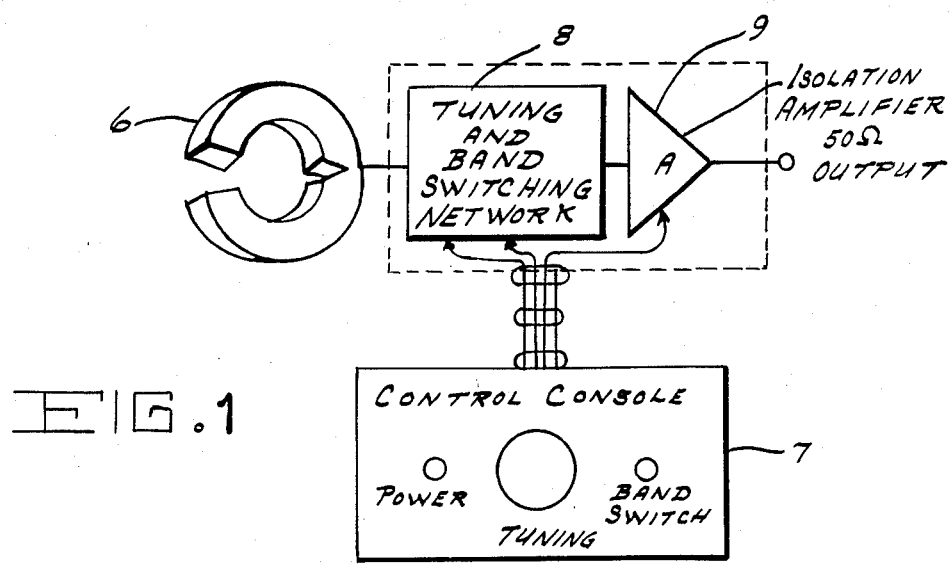
FIG. 1 is a block diagram illustrating the system of the invention.

A line current measuring system of the type comprehended by the invention is illustrated by the block diagram of FIG. 1. Probe 6 can consist of conventional inductive pick-off coils and resonance with the frequency of the signal being measured is achieved by means of tuning and band switching network 8. Isolation amplifier 9 interfaces the output of probe 6 with a current indicating meter (not shown). Control console 7 contains the system power supply and tuning and band switch control circuits. Probe 6 together with band switching network 8 and amplifier 9 comprise a sub-assembly representing one of several interchangeable measuring units. By way of example, a system utilizing three such measuring units (or probes) is hereinafter described in detail with reference to FIGS. 2-5. Each of the three probes (measuring units) has two overlapping, slightly greater than octave bands. The tuning ranges of the three probes overlap somewhat so that continuous coverage is available from 0.48 MHz to 51 MHz. The tuned current probe system is battery powered to make it independent of the power line. The batteries are contained in control console 7.

Figure 2:
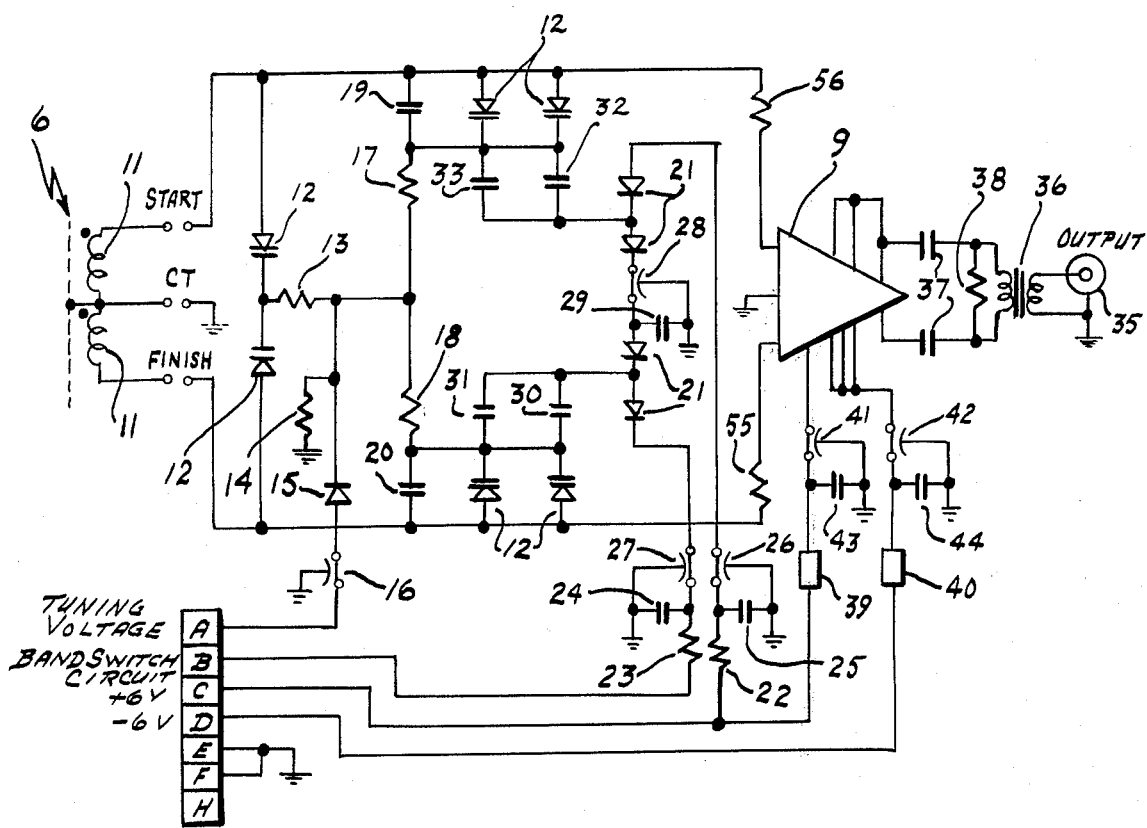
FIG. 2 is a schematic diagram of the balanced tuned current probe comprehended by the invention.

Each probe consists of a parallel tuned circuit driving a high impedance amplifier 9. Probe number three (the highest frequency range probe) is a balanced tuned circuit and amplifier, and probes one and two are unbalanced. FIG. 2 is a schematic diagram of probe number 3. The tuned circuit inductance consists of the balanced current probe coils 11, and the capacitance is made up of combinations of back-to-back voltage variable capacitance (VVC) diodes 12.

The VVC diodes are connected back-to-back to reduce any phase modulation distortion of the signal induced by the signal causing the VVC diodes capacitance to change. As the signal voltage increases the capacitance of one diode, it reduces the capacitance of the other diode so that if the signal voltages are small (0.1V or less) there is no net tuning effect on the tuned circuit. If the VVC diodes were not back-to-back the signal voltage would cause the tuning of the probe to vary at the signal frequency rate introducing distortion of the signal.

The tuning voltage is applied to the VVC diodes through a diode-resistor network to compensate for the effect of temperature on their junction capacitors. This tuning circuit consists of diode 15, resistors 13, 14, 17, 18 and capacitors 16, 19 and 20.

A diode switch switches four of the VVC diodes in or out depending upon whether the low or high band of the probe is selected. These switching diodes have a stray capacitance of 2 pF or less when off, and a dynamic impedance of less than 3 ohms when on. This switching circuit includes diodes 21, resistors 22, 23 and capacitors 24-33.

The signal voltage across the tuned circuit is applied to the input of high impedance balanced amplifier 9, through resistors 55, 56. Power is supplied to the amplifier 9 from 6-volt batteries by means of the circuit consisting of inductors 39, 40 and capacitors 41–44. The output of the amplifier is matched to a 50 ohm transmission line through the RC network of capacitors 37 and resistor 38 and BALUN transformer 36. The net circuit voltage gain from tuned circuit to coaxial output 35 is 23 db. The gain varies ± 2 db with a ± 1 volt change in the battery voltage, and has a variation of ± 1 db over the frequency range from 0.48 MHz to 51 MHz. The amplifier noise figure is approximately 5.5 db.

Figure 3:
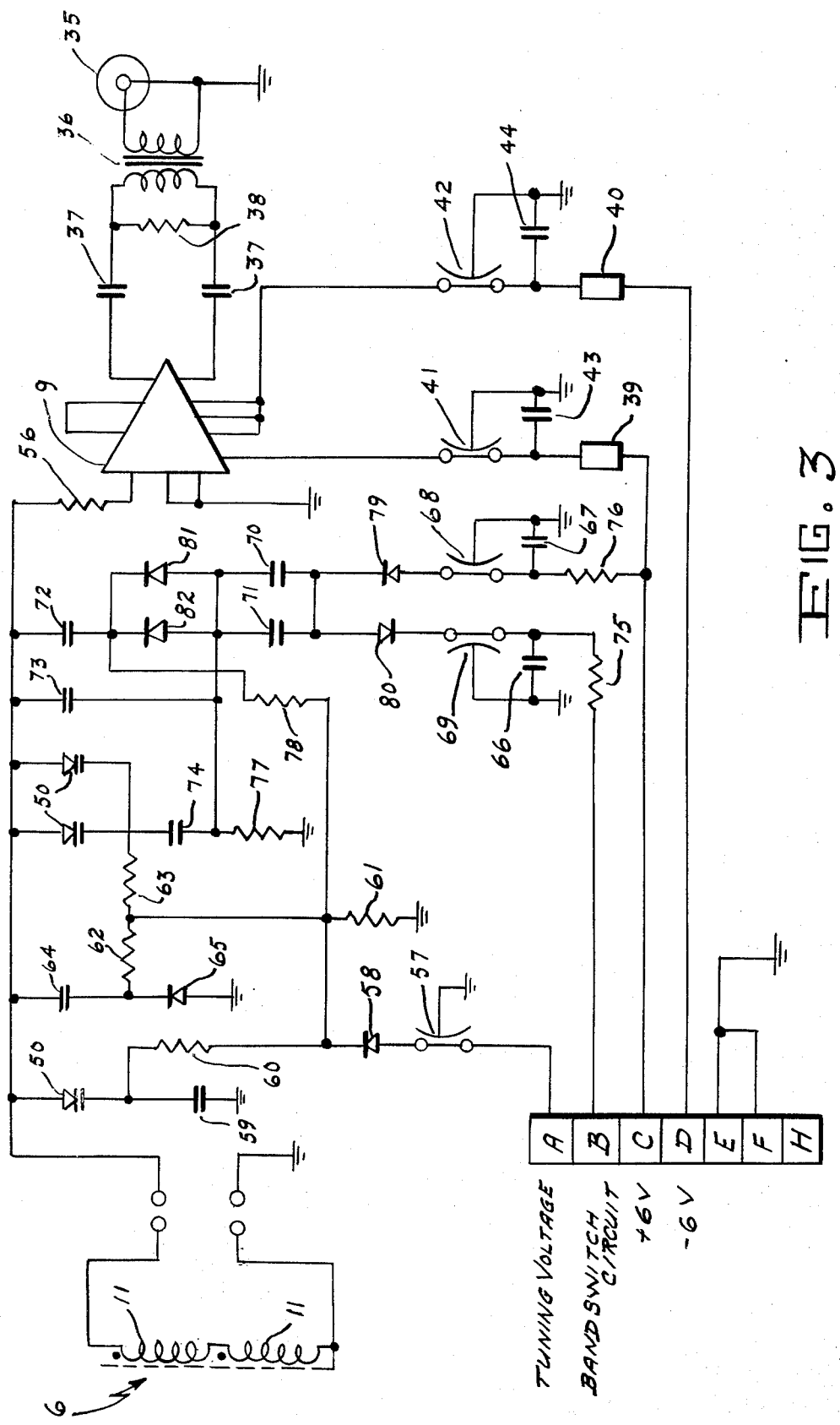
FIG. 3 is a schematic diagram of the tuned current probe comprehended by the invention.

Probes number 1 and 2 are unbalanced and are illustrated by the schematic diagram of FIG. 3. The resonant circuit of each of these probes comprises the inductance of pick-off coils 11 and the parallel capacitance of VVC diodes 50. The tuning voltage is applied to VVC diodes 50 through the tuning circuit comprising capacitors 57, 59, 64, diodes 58, 65 and resistors 60, 61, 62 and 63. The band switching network consists of capacitors 66–74, resistors 75, 76, 77 and switching diodes 79–82. The remainder of the circuit for each unbalanced probe is identical with the circuit of probe number three.

Figure 4:
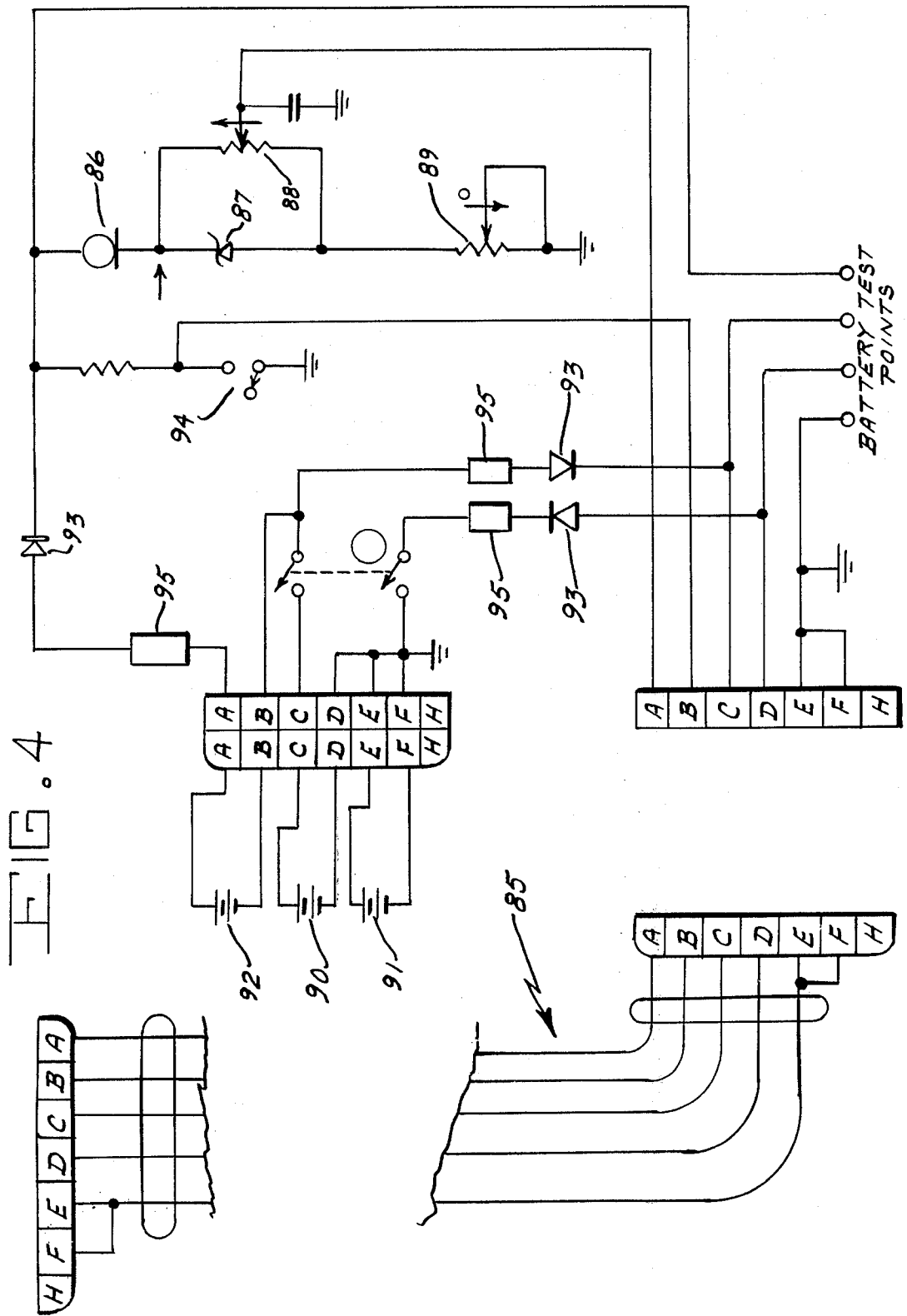
FIG. 4 is a schematic diagram of the control circuit of the invention.

The control console 7 contains the battery supply, the tuning voltage regulator, the tuning control, and the bandswitch control for the probes. It is connected to any one of the probes through five conductor shielded control cables 85. The control console circuit diagram is illustrated by FIG. 4.

The tuning voltage regulator consists of current regulator diode 86, temperature compensated voltage regulator diode 87 and potentiometers 88 and 89. Potentiometer 88 is a 10-turn precision potentiometer for tuning control, and potentiometer 89 is a 5K multiturn trimmer. The tuning potentiometer is driven by a turns-counting dial with a 2:1 vernier drive mechanism.

The bandswitch control provides a current path from the positive 6 volt battery 90 to ground to select the low band. In this position, 30 to 40 mA of current flows through the bandswitch circuit to turn the diodes on. To select the high band, the bandswitch control by means of switch 94 routes a reverse bias voltage to the bandswitch circuit to turn off the diodes and reduce their junction capacitance. This circuit is designed to be compatible with opencollector TTL integrated circuits.

The battery supply consists of eight ASA 1.5 volt type D cells and one NEDA 1604 9-volt battery (battery 92). Four of the D cells form negative 6 volt battery 91 and the other four form positive 6 volt battery 90. Included are steering diodes 93 and fuses 95 to protect the batteries and electronics from short circuits and/or improper battery installation.

Nickel-Cadmium or other rechargeable batteries may also be used in the system. Connectors are provided inside the console for operating the system on an external supply, and recharging the batteries if rechargeable batteries are used.

The tuning ranges of the particular system described herein are as follows:

a. Probe No. 1
  Low band   0.48 MHz to 1.1 MHz
  High band  1.05 MHz to 2.4 MHz b. Probe No. 2
  Low band   2.3 MHz to 5.3 MHz
  High band  5.0 MHz to 11.4 MHz c. Probe No. 3
  Low band   11.0 MHz to 25 MHz
  High band  24 MHz to 51 MHz The transfer impedance is in the range from 51 db to 68 db over the frequency range. The narrow band tangential sensitivity is from −30 db $\mu$A to −42 db $\mu$A in a 5 KHz bandwidth. The probes cause less than 0.5 db signal loss on the line being probed.

The tuned current probe of the present invention is basically a step-up transformer with a tuned secondary and a single turn inserted primary. In operation, the open-circuit voltage across the terminals of the secondary is proportional to the current in the primary, the primary to secondary turns ratio, the frequency, and the Q of the resonant circuit formed by the tuned secondary. The transfer impedance is defined as the ratio of output voltage from the secondary to current flowing in the primary. The higher the transfer impedance, the smaller the current that can be measured by a given instrument. Since the secondary output voltage is highest in the open circuit condition, a high to low impedance converter with a voltage gain of at least unity is necessary to interface between the tuned secondary and the voltage measuring device. The voltage measuring device is usually an interference analyzer or tunable voltmeter with an input impedance of 50 ohms. The high to low impedance converter is an amplifier with high input impedance and low output impedance. If the amplifier voltage gain is greater than unity, its voltage gain becomes an additional factor in the transfer impedance. If the tuned current probe uses a toroidal coil, as is common, the transfer impedance can be cosely approximated by the following relationship:

$Z_T = 4\pi(a/r)NQf\,Av\,10^{-9}$ ohms, where:
  $a$ is the cross-sectional area of the toroidal coil in square centimeters
  $r$ is the average radius of the toroid in centimeters
  $N$ is the number of coil turns
  $Q$ is the quality factor of the tuned circuit
  $f$ is the tuned frequency
  $Av$ is the voltage gain of the amplifier.

From the above relationship it may be seen that the transfer impedance can be increased by increasing the turns ratio, the Q, the amplifier gain or by changing the dimensions of the coil. There is of course a limiting value above which increases in in transfer impedance are accompanied by the addition of noise to the circuit by the active elements necessary to produce the increased transfer impedances.

Although the present invention has been described with reference to a specific embodiment, it is not intended that the same should be taken in a limiting sense. Accordingly, it is understood that the scope of the invention in its broader aspects is to be defined by the appended claims only and no limitation is to be inferred from definitive language used in describing the preferred embodiments.

What is claimed is:
1. A current probe for detecting the current value of a line conducted electrical signal comprising
  an inductive pick-off coil adapted for electromagnetic coupling to said line conducted electrical signal, and tuning means for tuning said inductive pick-off coil to resonate at the line conducted electrical signal frequency, said tuning means including at least one voltage variable capacitance diode connected in parallel with said inductive pick-off coil.

2. A current probe as defined in claim 1 wherein said inductive pick-off coil comprises first and second series connected toroidal coils, and said tuning means includes first and second back-to-back series connected voltage variable capacitance diodes, said toroidal coils being connected in parallel with said voltage variable capacitance diodes in a balanced circuit configuration 3. A tuned current probe system for detecting the current value of a line conducted electrical signal including a multiplicity of current probes each said probe comprising an inductive pick-off coil adapted for electromagnetic coupling to said line conducted electrical signal, and tuning means for tuning said inductive pick-off coil to resonate at the line conducted electrical signal frequency, the discrete frequency ranges of the individual probes comprising contiguous substantially octave increments of the system operating frequency range, the upper frequency increment probe having an inductive pick-off coil comprising first and second series connected toroidal coils, said upper frequency increment probe further having a tuning means that includes first and second back-to-back series connected voltage variable capacitance diodes, said toroidal coils being connected in parallel with said voltage variable capacitance diodes in a balanced circuit configuration.

* * * * *